United States Patent [19]

Straubel et al.

[11] 4,342,302

[45] Aug. 3, 1982

[54] CONTROL APPARATUS FOR A FUEL INJECTION PUMP

[75] Inventors: Max Straubel, Stuttgart; Max Greiner, Gerlingen; Helmut Laufer, Stuttgart, all of Fed. Rep. of Germany

[73] Assignee: Robert Bosch GmbH, Stuttgart, Fed. Rep. of Germany

[21] Appl. No.: 151,846

[22] Filed: May 21, 1980

[30] Foreign Application Priority Data

Jun. 9, 1979 [DE] Fed. Rep. of Germany ....... 2923445

[51] Int. Cl.³ ........................ F02D 1/02; F02D 1/16; F02M 39/00
[52] U.S. Cl. ................................................ 123/502
[58] Field of Search ........................................ 123/502

[56] References Cited

U.S. PATENT DOCUMENTS

| 3,447,520 | 6/1969 | Druri | 123/502 |
| 3,665,907 | 5/1972 | Laufer | 123/502 |
| 4,132,508 | 1/1979 | Mowbray | 123/502 |
| 4,202,303 | 5/1980 | Mowbray | 123/502 |
| 4,273,090 | 6/1981 | Hofer et al. | 123/502 |

FOREIGN PATENT DOCUMENTS

| 2935283 | 8/1980 | Fed. Rep. of Germany | 123/502 |
| 55-84823 | 6/1980 | Japan | 123/502 |
| 55-146237 | 11/1980 | Japan | 123/502 |
| 1441262 | 6/1976 | United Kingdom | 123/502 |
| 2052647 | 1/1981 | United Kingdom | 123/502 |

*Primary Examiner*—Wendell E. Burns
*Attorney, Agent, or Firm*—Edwin E. Greigg

[57] ABSTRACT

The invention relates to a control apparatus for the variation of the onset of supply by a fuel injection pump having an adjustment piston engaging the piston cam drive, the adjustment piston under rpm-dependent pressure being adjustable counter to a restoring force by a fluid located in a work chamber of the adjustment piston, and an assembly for prolonging the supply time and at least during pump supply on the basis of the restoring and reactionary force including displacing the adjustment piston counter to the fluid pressure.

5 Claims, 5 Drawing Figures

CONTROL APPARATUS FOR A FUEL INJECTION PUMP

BACKGROUND OF THE INVENTION

The invention relates to a control apparatus for the variation of the onset of supply by a fuel injection pump having an adjustment piston engaging the piston cam drive, the adjustment piston under rpm-dependent pressure being adjustable counter to a restoring force by a fluid located in a work chamber of the adjustment piston, and an assembly for prolonging the supply time and at least during pump supply on the basis of the restoring and reactionary force including displacing the adjustment piston counter to the fluid pressure.

One means of damping noise development in Diesel engines consists in the prolongation of the injection duration during idling or at relatively low partial-load. In a known fuel injection system, a portion of the fuel supplied by the injection pump piston flows off unutilized, for the purpose of prolonging the injection time, so that the portion of fuel proceeding to injection must be supplied for a relatively longer time, in order to maintain the rpm. This known means of regulation is relatively expensive, and there is a certain difficulty in regulating the quantity of fuel, because the quantity which flows off must also be taken into account in the regulation which occurs by means of shutoff control or shutdown control. These disadvantages are more serious than may appear at first sight, because in the case of feeding in any engine characteristics for regulation purposes, as is increasingly necessary, a corresponding amount of attention must also be paid to this outflow quantity, serving the purpose of smooth running, with all the correction transducers which are necessary to achieve this.

OBJECT AND SUMMARY OF THE INVENTION

The fuel injection pump according to the invention and control apparatus for the variation of the onset of supply by a fuel injection pump having an adjustment piston engaging the piston cam drive, the adjustment piston under rpm-dependent pressure being adjustable counter to a restoring force by a fluid located in a work chamber of the adjustment piston, and an assembly for prolonging the supply time and at least during pump supply on the basis of the restoring and reactionary force including displacing the adjustment piston counter to the fluid pressure.

Further advantage over the prior art is found in an assembly or apparatus of prolonging the injection time without exerting any other influences and without disadvantages, particularly without requiring additional expense for regulating the quantity proceeding to injection. The control of the injection time prolongation may be accomplished in the simplest manner, either mechanically or electrically, but may arbitrarily also be performed essentially automatically. In accordance with the invention, the supply movement of the pump piston per angle of rotation is slowed down for the purpose of prolonging the injection time. Because a displacement of the injection adjustment piston is possible only with increasing force, a continuous movement of the pump piston is also assured during the provided injected portion or portion of time thereof.

The invention will be better understood and further objects and advantages thereof will become more apparent from the ensuing detailed description of preferred embodiments taken with the drawings.

DETAILED DESCRIPTION OF THE PREFERRED EMBODIMENTS

Figure 1:
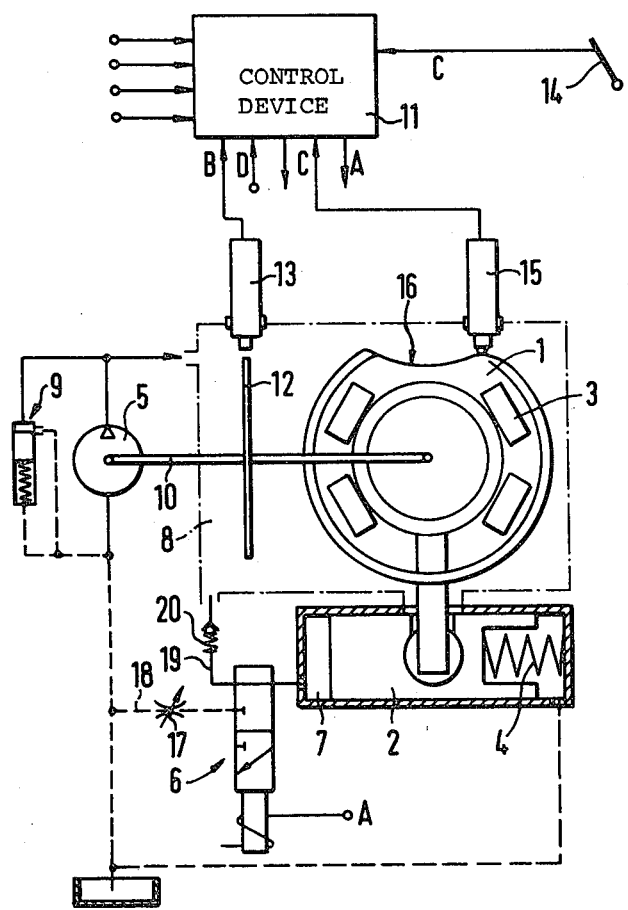
FIGS. 1-4 are schematic and exemplary embodiments shown in highly simplified form and embodying a preferred embodiment of the invention.

Referring to a fuel injection pump given in FIG. 1, there is shown a roller ring 1, which is supported stationary per se, and rotated relatively in its position by means of an injection adjustment piston 2. In known manner, a cam disc which rotates in common with the pump piston is set via the rollers 3 in reciprocating motion along with the pump piston, with the rotary motion assuming the function of distribution control and the reciprocal motion assuming the pumping function. The injection adjustment piston 2 is adjusted hydraulically counter to the force of the restoring spring 4. Depending upon the position of the piston 2, that is, depending upon the dimension of the hydraulic pressure actuating the piston, the onset of injection is displaced generally toward "early" with increasing rpm. In the illustrated example, the hydraulic flow actuating the adjustment piston 2 is generated by a pump 5 and is directed via a magnetic valve 6 toward the compression chamber 7 of the injection adjustment piston 2. This hydraulic fluid is normally Diesel fuel, which, as shown, flows through the suction chamber 8, indicated in broken lines, of the fuel injection pump. The actual pump work chamber, not shown, is also supplied with fuel from this suction chamber 8. The pressure of the fuel is controlled in accordance with rpm via a pressure control valve 9. The pump 5 is coupled, in the manner indicated by the shaft 10, to the drive shaft of the fuel injection pump and supplies an rpm-dependent quantity the pressure of which is controlled via the pressure control valve 9 and increases as the quantity increases. The magnetic valve 6 is triggered in accordance with the embodiment of the drawings via the terminals A of an electronic control device 11. The injection onset adjustment generally occurs in accordance with rpm, so that the electronic control device 11 must be supplied as well with the rpm of the engine or of the pump. For this reason, the shaft 10 is coupled with a face gear 12, which detects the rpm in a known manner with a transducer 13, and, as shown, furnishes this information to the electronic control device 11. As further variables, the load over the position of the gas pedal 14 at B or the temperature C, the pressure P, and so forth, can be supplied to the electronic control device 11 as actual specific values. The actual value of the injection adjustment itself is detected by way of a transducer 15 and is fed to the electronic control device 11 at C. The evaluation of these actual values occurs in accordance with the program of the control device 11. The illustrated examples are embodied in accordance with the increasing trend of providing fuel injection pumps with electric elements; however, as is known, they can also be regulated with mechanical means.

During the compression stroke of the pump piston, tangential forces are exerted, via the axial forces of the same, via the rollers, onto the roller ring 1 and by displacing the piston 2, tends to rotate the direction of the force of the spring 4 counter to the pressure in the compression chamber 7. In accordance with the invention there is slight yielding in response to this pressure, so that a stroke of the injection piston still occurs, but it is delayed in its speed as a result of the yielding of the roller ring 1. This delay brings about a prolongation of the injection time and is intended to occur only in such engine ranges as idling and partial load, at which the noise development of the engine is particularly annoying. In the other ranges of the engine, and in particular at maximum rpm, a time lag of this kind would be associated with the disadvantage that the portion of time between the individual compression strokes of the injection pump would not be sufficient for return travel of the adjustment piston. On the other hand, at these high rpms, there is the possibility that as a result of the sluggishness of the system, a time lag of this kind might appear only to a very slight extent and would thus be negligible. This essentially depends upon the type of system being used.

The delayed motion of the adjustment piston 2 must be permitted to occur only to the extend that a pumping motion of the injection piston is still assured. The quantity of the fuel flowing out of the compression chamber 7 during the compression stroke must accordingly be controlled in a purposeful manner.

Although in the preferred exemplary embodiment shown in FIG. 1 the magnetic valve 6 is utilized for the purpose of control, a valve of this kind is not absolutely necessary in order to realize the invention. It is equally conceivable that a valve may be disposed between the suction chamber 8 of the injection pump and compression chamber 7 of the adjustment piston 2, such as a check valve, which acts in unthrottled fashion in a positive direction counter to the force of the restoring spring 4 yet in the opposite direction, that is in the delaying direction, it acts in a throttled manner. As a result, it is assured that only a portion of the fuel quantity effecting the return of the adjustment piston 2 during the interval between injections can flow back during the compression stroke in a yielding manner via this valve. Precise control is, however, assured if, as in the preferred and exemplary embodiment, the magnetic valve 6 is used. During the suction stroke of the pump piston, this valve opens the passage between the chamber 8 and the chamber 7, as indicated in the figure, and then switches over during the compression stroke for the period of time which is intended for the lag of the adjustment piston 2. As a result of the use of an adjustable throttle 17 in the outflow channel 18, this outflow or time lag can be delayed appropriately. Here, as well, although it is not absolutely necessary, a check valve 20 can be inserted in this connecting line 19, again in a known manner, this valve 20 preventing the supply pressureimpact from causing return movement of the adjustment piston 2. At higher rpms, the magnetic valve 6 is then in the illustrated switching position during the supply stroke; alternatively, a return flow throttle must be p provided parallel to the check valve 20, so that a flow back and forth between the compression chamber 7 and the suction chamber 8 will occur in the conventional manner.

Figure 2:
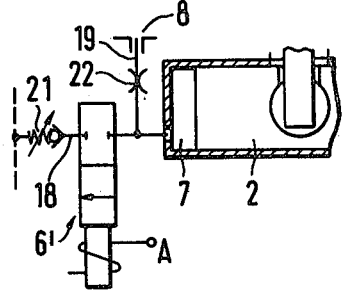

In the exemplary embodiment shown in FIG. 2, an adjustable check valve 21 is disposed in the outflow line 18. The magnetic valve 6' is here embodied, in contrast to the 3/2-way valve of the first exemplary embodiment, as a 2/2-way valve and is put into action only at relatively low rpms, that is, at idling and partial-load, that is at such times as the time lag for the injection prolongation is intended to occur. The opening pressure of this check valve 21 must be greater than the adjustment pressure of the adjustment piston 2 at idling and at relatively low partial-load, but it must be smaller than this adjustment pressure plus the reaction pressure caused by the pump piston during the compression stroke. In a known manner, a throttle 22 is disposed in the line 19 between the compression chamber 7 and the suction chamber 8.

Figure 3:
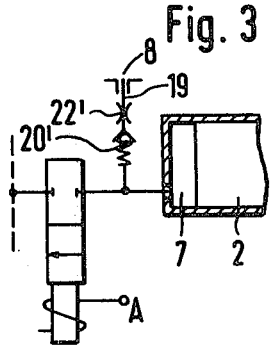

In the third exemplary embodiment shown in FIG. 3, a throttle 22' and a check valve 20' are disposed in series in the line located between the suction chamber 8 and the compression chamber 7 of the injection adjustment piston 2. As a result, it is attained in an advantageous manner that the throttle 22' can be selected as a large throttle and it is thus assured that sufficient fuel quantity can flow out of chamber 8 into chamber 7 between two injection windows, and that the piston 2 again returns punctually to its initial position. The check valve 20' prevents a return flow out of the chamber 7 toward the chamber 8, that is, it prevents yielding of the piston 2 in operational ranges in which a prolongation of the injection duration is undesirable.

Figure 4:
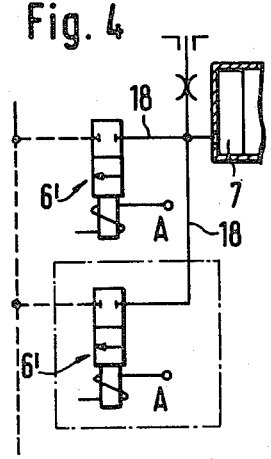

In the fourth exemplary embodiment shown in FIG. 4, the outflow channel 18 is divided into two lines, in each of which one magnetic valve 6' is disposed, which is embodied as a 2/2-way valve. These multiple position valves have a variably large passage cross section, the valve with the larger cross section being used to control the yielding of the adjustment piston 2, while the valve with the smaller cross section is used for normal operation. It is also conceivable, however, that both valves may be used for the adjustment of the amount of yield, and only one valve may be used for normal operation. However, the use of two magnetic valves is of advantage because a high degree of yielding may be desired for prolonging the injection during idling, yet as a result of a large valve cross section an excessively high adjustment velocity toward "late" may result in operational areas in which this is not desired. Because at the same time magnetic valves with a large cross section function more slowly, this rapid "late" displacement cannot be corrected rapidly enough. Therefore, a magnetic valve having a small cross section is used for normal operation.

Figure 5:
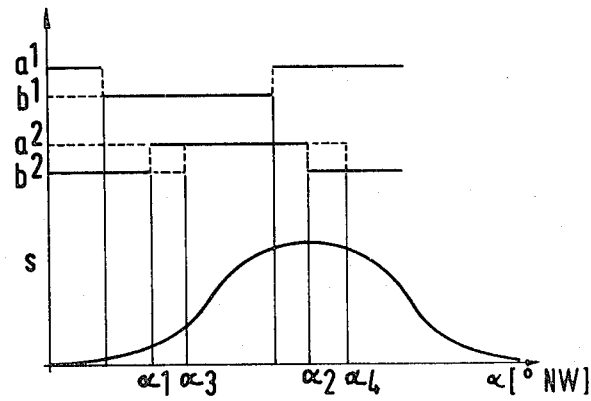
FIG. 5 is a plot diagram given for the exemplary embodiment of FIG. 4.

In FIG. 5, the possible control behavior of these two valves is shown in a plot diagram. Above the abscissa, on which the cam angle of the pump is plotted, the stroke s of the pump piston is plotted on the ordinate in the lower range and above this the magnetic valve switching position is shown; a indicating switched on and b indicating switched off. The upper switching curve relates to the valve having a smaller passage cross section and used during normal operation, while the lower switching curve pertains to the magnetic valve having the larger passage cross section, which causes the actual prolongation of injection time. Up to the beginning of the compression stroke, the magnetic valve is opened for normal operation, as line $a_1$ and is then closed as line $b_1$, until about the end of the compression stroke. It is otherwise with the magnetic valve effecting the prolongation of injection time, which is closed per se up to the rotary angle $\alpha 1$, that is, after the onset of the compression stroke, and then, as $a_2$, up to the onset of the new suction stroke, is opened at rotary angle $\alpha 2$. The opening time portion may be varied as needed; for instance, the onset of opening may be set at $\alpha 3$ and the closing may be set at $\alpha 4$.

As the individual examples illustrate, a multiplicity of variations is conceivable for controlling this time lag of the adjustment piston 2, which effects the prolongation of injection time, during the compression stroke at idling and at relatively low partial load. This control may be accomplished mechanically, electrically or in combinations of these means.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A control apparatus for the variation of the onset of supply by a fuel injection pump having a cam drive, the control apparatus including:
    a fluid supply pump connected to the engine and the fuel injection pump to provide fluid at an rpm-dependent pressure to the fuel injection pump.
    an adjustment piston connected to the cam drive to adjust cam drive position, and having a work chamber connected to the fluid supply pump such that the fluid provides a biasing force to the work chamber which biases the adjustment piston in a first direction;
    a restoring means connected to the adjustment piston and which generates a restoring force to bias the adjustment piston in a second direction;
    wherein the adjustment piston is connected to the supply pump and the cam drive such that the cam drive generates a reactionary force to bias the adjustment piston in the second direction upon actuation of the supply pump;
    a control means connected to the work chamber which controls fluid flow out of the work chamber such that the adjustment piston is displaced in the second direction in response to the restoring force and the reactionary force to prolong the supply of fuel to the fuel injection pump.

2. A control apparatus as defined in claim 1, wherein the control means is a check valve which opens in response to an opening force that is greater than the restoring force, and smaller than the sum of the restoring force and the reactionary force.

3. A control apparatus as defined in claim 2 also including a blocking means connected to the check valve and the engine to block the check valve from opening at engine rpm above engine idling rpm.

4. A control apparatus as defined in claim 1, wherein the control means is an electromagnetically actuated multiple-position valve.

5. A control apparatus as defined in claim 4, also including a relief means connected to relieve the fluid from the fuel injection pump, wherein, when the multiple-position valve is in a first position, the work chamber is connected to the supply pump, and when the multiple-position valve is in a second position, the work chamber is connected to the relief means.

* * * * *